Figure 1:
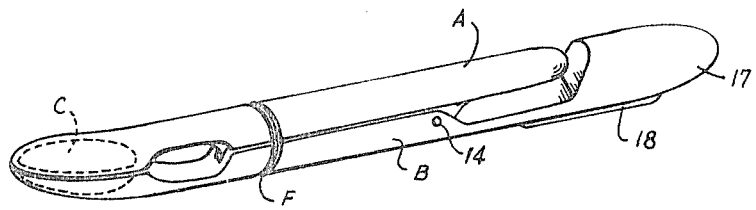

United States Patent
De Bruhl

[15] 3,643,279
[45] Feb. 22, 1972

[54] EYEGLASS CLEANER

[72] Inventor: Alonzo M. De Bruhl, 11 Shrevewood Drive, Taylors, S.C. 29687

[22] Filed: July 27, 1970

[21] Appl. No.: 58,476

[52] U.S. Cl. ............................................15/104.94, 15/214
[51] Int. Cl. ..........................................................G02c 13/00
[58] Field of Search..............15/104.93, 104.94, 210 A, 214, 15/218; 24/252 A, 252 CP; 401/10

[56] References Cited

UNITED STATES PATENTS

| | | | |
|---|---|---|---|
| 2,055,314 | 9/1936 | Seburger | 401/10 |
| 3,051,979 | 9/1962 | Parsons | 15/104.94 |
| 2,840,874 | 7/1958 | Sauerman | 24/252 CP X |
| 654,486 | 7/1900 | Pederson | 15/214 |
| 270,885 | 1/1883 | Birch | 15/214 |

FOREIGN PATENTS OR APPLICATIONS

| | | | |
|---|---|---|---|
| 285,197 | 12/1952 | Switzerland | 15/214 |
| 738,616 | 10/1932 | France | 15/214 |
| 118,458 | 4/1944 | Australia | 24/252 A |
| 806,980 | 1/1959 | Great Britain | 15/214 |

*Primary Examiner*—Daniel Blum
*Attorney*—Bailey and Dority

[57] ABSTRACT

An apparatus for applying a cleaning agent simultaneously to both sides of the lens of a pair of eyeglasses. The apparatus includes a pair of arms that are pivotally connected together, and have cup-shaped recesses carried adjacent one end thereof. Positioned within each recess is an absorbent material saturated with a cleaning agent. A rim extends around the recesses for minimizing evaporation of the cleaning agent when the arms are in a closed position.

2 Claims, 3 Drawing Figures

INVENTOR.
ALONZO M. DE BRUHL

BY Bailey + Dority
ATTORNEYS

EYEGLASS CLEANER

This invention relates to an apparatus for aiding in cleaning eyeglasses, and more particularly to an apparatus which can be conveniently carried around and readily used on eyeglass lenses.

It is very important for wearers of eyeglasses to maintain the lenses thereof clean at all times. Normally, a wearer will clean his eyeglasses upon putting them on in the morning, and with his handkerchief during the day. However, frequently the handkerchiefs are soiled from various oils, such as carried on one's hand, preventing the lens from becoming perfectly clean. Furthermore, oils are frequently imparted to the lenses from the wearer's hand and body. These oils are difficult to remove from the lenses without a special cleaning agent.

Various chemicals, treated papers, and solutions have been provided for cleaning the lens of oil that may collect thereon, but these devices are often inconvenient to carry around. Furthermore, the treated paper will sometimes dry out destroying its effectiveness.

Accordingly, it is an important object of the present invention to provide an apparatus which can simultaneously clean both sides of the lenses on a pair of eyeglasses.

Another important object of the present invention is to provide an apparatus for cleaning eyeglasses which can be conveniently carried by the wearer in a coat pocket or the like.

Still another important object of the present invention is to provide an apparatus for applying a cleaning agent simultaneously to both sides of the lenses of a pair of eyeglasses wherein, when not in use the pads which are used to apply the cleaning agent are maintained in an enclosure for minimizing evaporation thereof.

The construction designed to carry out the invention will be hereinafter described, together with other features thereof.

Figure 2:
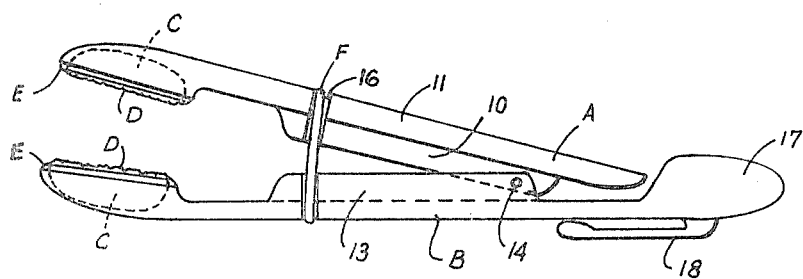
Figure 3:
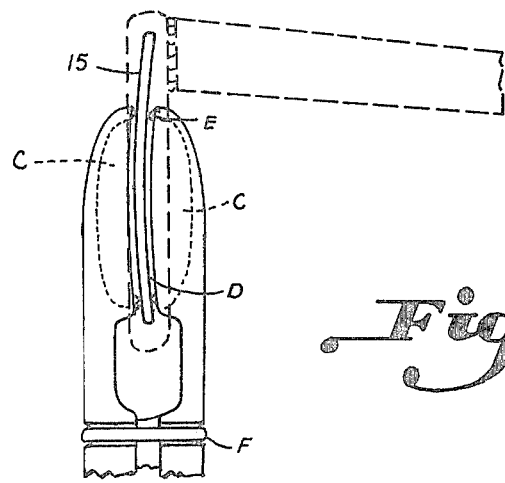

The invention will be more readily understood from a reading of the following specification, and by reference to the accompanying drawing forming a part thereof, wherein an example of the invention is shown and wherein:

FIG. 1 is a perspective view illustrating an apparatus for cleaning the lenses of a pair of eyeglasses in a closed position, FIG. 2 is a side elevational view of the apparatus illustrated in FIG. 1, shown in an open position, and FIG. 3 is an enlarged fragmentary elevational view illustrating the apparatus being used to apply a cleaning agent to the lens of a pair of eyeglasses.

The drawing illustrates an apparatus for applying a cleaning agent simultaneously to both sides of a lens of a pair of eyeglasses. The apparatus includes a first elongated arm member A and a second elongated arm member B. Means are provided for pivotally connecting the arm members A and B together. A cup-shaped recess is carried adjacent one end of the arm members A and B. The cup-shaped recesses C face each other and have an absorbent material D saturated with a cleaning agent carried therein. A rim E extends around the recesses C. Resilient means F urges the ends of the arms in which the recesses are located together to a closed position wherein, when a lens of a pair of eyeglasses is inserted therebetween the absorbent material D contacts the lens and applies the cleaning agent thereto. When the lens is removed from between the arms the rims E around the recesses C enclose the absorbent material, minimizing evaporation of the cleaning agent carried thereon.

The elongated members A and B may be constructed of any suitable material, such as plastic. The elongated member A is semicircular and has a tongue 10 projecting from a main body portion 11. Adjacent one end of the first elongated arm A is a cup-shaped recess C. The elongated member B has a main body portion which has two opposed upwardly projecting members 13 carried thereon which define a groove therebetween into which the tongue 10 of the elongated member A is carried. A pin 14 extends through the upwardly projecting members 13 and the tongue portion 10 for allowing the elongated member A to pivot thereon within the groove. A recessed shaped cup C is provided in one end of the elongated member B facing the recessed cup-shaped member C provided in elongated member A. An absorbent cotton pad D is carried within the recessed shaped cup members C. The absorbent pads D are treated with a conventional liquid cleaning agent which, when applied to the lens of an eyeglass clean such.

A rim E extends around each of the recesses C for providing an enclosure when the elongated members A and B are in the closed position, such as shown in FIG. 1. These rims E contact each other and minimize evaporation of the cleaning agent from the absorbent pad D. It is noted that the absorbent pad D extends beyond the rim E so that such will contact the lens 15 of a pair of glasses when the lens are positioned therebetween, such as shown in FIG. 3. A resilient means F is carried within a groove 16 provided on the main body of the elongated members A and B. This resilient means F, in one particular embodiment, takes the form of an elastic O-ring which urges the elongated arm members A and B to the closed position. This is to prevent evaporation of the cleaning agent, as well as for applying a pressure to the lens during the cleaning operation.

The pin 14 which provides a pivot point for the elongated arm member A is located above the main body of the elongated arm member B so that the end of the member A opposite from that in which the recess C is provided can be depressed by the user's thumb or the like, to open the arms A and B to the position illustrated in FIG. 2. The arm member B has an enlarged head 17 to which a clip 18 is attached by any suitable means so that the apparatus can be conveniently carried in one's pocket.

In operation, prior to using the apparatus a liquid cleaning agent is applied to the pads D carried within the recesses C. When it is desired to clean the lenses of a pair of eyeglasses a lens 15 is positioned between the pads D and the apparatus is manipulated with a circular motion to engage the entire surface of the lens. The resilient means F applies pressure on the lens so that there will be sufficient contact between the pads and the lens to produce a cleaning action. After the cleaning agent has been applied to the lens a clean cloth may be used to remove such therefrom.

While a preferred embodiment of the invention has been described using specific terms, such description is for illustrative purposes only, and it is to be understood that changes and variations may be made without departing from the spirit or scope of the following claims.

What is claimed is:

1. An apparatus for applying a cleaning agent simultaneously to both sides of a lens of a pair of eyeglasses comprising: a first elongated arm member, a second elongated arm member, a cup-shaped recess carried adjacent one end of each of said arm members, said cup-shaped recesses facing each other, means pivotally connecting said arm members together including a pivot positioned above one of said arm members so that an end of said other arm member opposite said one end can be depressed for opening said one end of said arm members, absorbent compressible material saturated with said cleaning agent carried in said recesses and projecting above the same, a rim extending around said recesses, resilient means urging said one end of said arms together to a closed position wherein when a lens of a pair of eyeglasses is inserted therebetween said absorbent material contacts said lens and applies said cleaning agent thereto, and wherein when said lens is removed from between said arms said rims around said recesses enclose said absorbent material minimizing evaporation of said cleaning agent.

2. An apparatus as set forth in claim 1, wherein said resilient means includes an O-ring which extends around both of said arms for urging said arms together.

* * * * *